United States Patent
Loft et al.

[15] 3,671,491
[45] June 20, 1972

[54] RANDOM BENZIMIDAZOLE-BENZOXAZOLE COPOLYMERS AND METHODS OF PREPARATION

[72] Inventors: John T. Loft, Springfield; Anthony B. Conciatori, Chatham; Edward C. Chenevey, North Plainfield, all of N.J.

[73] Assignee: Celanese Corporation, New York, N.Y.

[22] Filed: March 26, 1969

[21] Appl. No.: 810,813

[52] U.S. Cl..................260/47 CP, 117/161 UN, 260/30.2, 260/30.6 R, 260/30.8 R, 260/32.6 N, 260/37 N, 260/63 R, 260/65, 260/78 TF, 260/823
[51] Int. Cl.................................................C08g 33/02
[58] Field of Search.................260/47 CZ, 78 TF, 78.4, 65, 260/63 R, 857, 823

[56] References Cited

UNITED STATES PATENTS

| R26,065 | 7/1966 | Marvel et al. | 260/47 |
| 2,904,537 | 9/1959 | Brinker et al. | 260/78 |
| 3,230,196 | 1/1966 | Moyer | 260/47 |
| 3,306,876 | 2/1967 | Kantor et al. | 260/47 |
| 3,313,783 | 4/1967 | Iwakura et al. | 260/78 |

*Primary Examiner*—William H. Short
*Assistant Examiner*—L. L. Lee
*Attorney*—Thomas J. Morgan, C. B. Barris and C. E. Miller

[57] ABSTRACT

Random copolymers which consist essentially of from about 90 to about 10 percent of recurring benzimidazole structural units and correspondingly from about 10 to about 90 percent of recurring benzoxazole structural units are provided. Several polymerization methods including, for example, a two stage melt-solid state procedure, are described.

12 Claims, No Drawings

RANDOM BENZIMIDAZOLE-BENZOXAZOLE COPOLYMERS AND METHODS OF PREPARATION

BACKGROUND OF THE INVENTION

The present invention relates to condensation polymers, and more particularly, to random benzimidazole-benzoxazole copolymers and to processes for making them.

Since their discovery, linear condensation polymers such as the polyamides and polyesters have found wide application in the plastics industry in the form of fibers, films, and molded articles The poly amides described in, for example, Wallace H. Carother's U.S. Pat. Nos. 2,071,250, 2,071,253, and 2,130,948 are tough, wear resistant, resilient, stable polymers useful over a wide range of conditions. The search has continued, however, for improved polymers having higher softening points, better retention of stiffness and toughness at elevated temperatures, and improved resistance to water and oxygen.

As a result of this search for improved polymers, polybenzimidazoles and polybenzoxazoles have been discovered. Polybenzimidazoles are described for example, in U.S. Pat. Nos. 2,895,948, Re 26,065, and in Vogel et al., Journal of Polymer Science, Volume 50, pages 511 to 539 (1961). Polybenzoxazoles are described, for example, in U.S. Pat. Nos. 3,230,196, 3,306,876, and British Pat. No. 811,758.

The polybenzimidazoles and polybenzoxazoles, and particularly the aromatic polybenzimidazoles and polybenzoxazoles, are characterized by a high degree of thermal stability. They may be shaped to form fibers, films, and other articles of wide utility which show resistance to degradation by moderate heat, hydrolytic media, and oxidizing media.

The polybenzimidazoles, however, are susceptible to air oxidation at higher temperatures, e.g., temperatures of about 550° C. and higher. Further, the polybenzoxazoles suffer from disadvantages such as a relatively low solubility in common organic solvents such as dimethyl acetamide.

SUMMARY OF THE INVENTION

Accordingly, an object of the present invention is to provide condensation polymers characterized by improved thermal stability as compared to benzimidazole homopolymers.

Another object is to provide condensation polymers characterized by improved solubility in common organic solvents as compared to benzoxazole homopolymers.

Another object is to provide processes for preparing random copolymers containing both recurring benzimidazole structural units and benzoxazole structural units without incurring or substantially alleviating disadvantages of benzimidazole homopolymers and benzoxazole homopolymers.

Other and further objects and advantages of the present invention will become apparent from the following detailed description.

In accordance with the present invention, random copolymers are provided which consist essentially of from about 90 to about 10 percent of recurring benzimidazole structural units and correspondingly from about 10 to about 90 percent of recurring benzoxazole structural units.

Preferably, the random copolymer contains from 90 to 50 percent, and most preferably 90 to 60 percent, recurring benzimidazole structural units and, correspondingly, from 10 to 50 percent or 10 to 40 percent, of recurring benzoxazole structural units, which can result in greater solubility in solvents such as dimethylacetamide.

The recurring benzimidazole structural units can be exemplified by the formulas

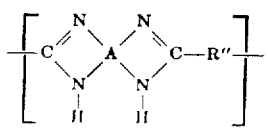

and

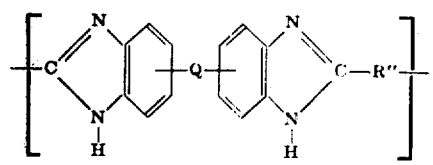

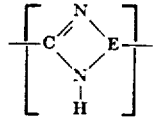

The recurring benzoxazole structural units can be exemplified by the formulas

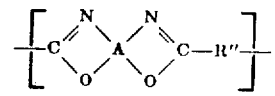

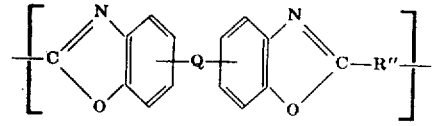

and

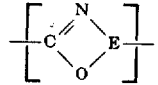

wherein A is selected from the group consisting of

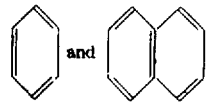

wherein Q is selected from the group consisting of

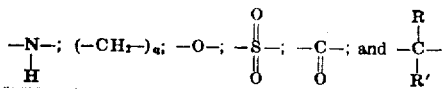

wherein R and R' are monovalent hydrocarbon radicals, $q$ is a whole number equal to from 1 to 6 inclusive, and the bonds of Q are para to either of the oxygen or nitrogen atoms,
wherein R" is a divalent radical selected from the groups consisting of arylene and alkylene radicals; and
wherein E is selected from the groups consisting of

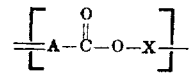

and

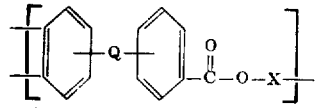

wherein X is selected from the groups consisting of hydrogen, alkyl and aryl divalent radicals.

The process for making the above defined random copolymers comprises reacting one or more aromatic tetraamino compounds, one or more diaminodihydroxy aromatic compounds and one or more aromatic dicarboxylic acid anhydrides or diesters or mixtures thereof.

While aliphatic dicarboxylic acids may also be used in lieu of all or a portion of the aromatic dicarboxylic acid anhydrides and diesters, the aromatic dicarboxylic anhydrides and diesters are preferably used so as to obtain a more thermally stable copolymer.

Optionally, the reaction mixture can also contain one or more aromatic diamino carboxylate compounds and/or one or more aromatic hydroxy amino carboxylate compounds in lieu of all or a portion, e.g., about 5 to 95 percent, of the tetraamino compounds and/or the diaminodihydroxy compounds, respectively.

If the tetraamino compound and/or the diaminodihydroxy compound are replaced practically or completely, however, the amount of dicarboxylic acid or derivative in the reaction mixture may be lessened in an equimolar proportion, and may be omitted altogether where both the tetraamino compound and the diaminodihydroxy compound are replaced completely.

The preferred polymerization method is a melt-solid state procedure described hereinafter in more detail.

Other aspects of the present invention will be apparent from the following more detailed description.

DESCRIPTION OF THE PREFERRED EMBODIMENTS

Any aromatic tetraamine compound containing two ortho-diamino groups may be used in the present invention to prepare the random benzimidazole-benzoxazole copolymers.

The aromatic tetraamines may be represented by the general formula:

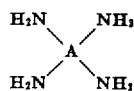

wherein A is aromatic and each amino group of said tetraamine is attached directly to a carbon atom of the aromatic nucleus and is in ortho relationship to another of the directly attached amino groups.

The A aromatic may be any mono or poly nuclear aromatic such as phenylene, naphthalene, biphenylene and the like. More particularly, it may be a mono or poly nuclear aromatic such as

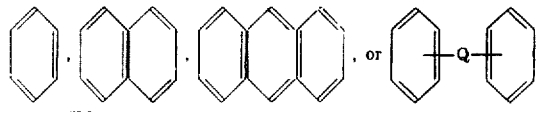

wherein Q can be an aliphatic group containing from one to six, and preferably from one to three, carbon atoms; an aromatic group; e.g., phenylene;

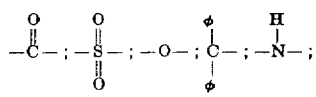

a covalent bond; or the like.

Preferably, Q is a covalent bond or —O—, and is para to an amino group on each aromatic nucleus. The A and Q groups may also contain inert substituents, i.e., substituents which do not interfere with the polymerization reaction in the system.

Non-limiting examples of suitable specific aromatic tetraamines which may also be used in the present invention are 3,3'-diamino benzidine; bis(3,4-diamino phenyl) methane; 1,2-bis (3,4-diamino phenyl) ethane; 2,2'-bis(3,4-diamino phenyl) propane; bis(3,4-diamino phenyl) ether; bis(3,4-diamino phenyl) sulfide; bis (3,4-diamino phenyl) sulfone; 1,2,4,5-tetraaminobenzene; 2,3,6,7-tetraaminonaphthalene; and the corresponding ring hydrogenated tetraamines.

The preferred aromatic tetraamines are 3,3'-diaminobenzidine and bis(3,4-diamino phenyl) ether.

The manner in which the aromatic tetraamine is prepared is well known and does not form a part of the present invention.

The diaminodihydroxy aromatic compound used in the present invention to prepare the copolymers may be any diaminodihydroxy aromatic compound having two ortho-aminohydroxy groups, i.e., each of the hydroxy groups in ortho relationship to one of the amino groups and vice versa.

The diaminodihydroxy aromatic compounds may be represented by the general formula:

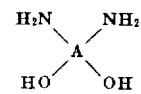

wherein A has the meaning given above in the tetraamine description and each amino and/or hydroxy group of said compound is attached directly to a carbon atom of the aromatic nucleus and each hydroxy group is in ortho relationship to at least one of the directly attached amino groups, and vice versa, i.e., each amino group is in ortho relationship to at least one hydroxy group.

Q is preferably covalent bond, and is preferably para to the amino group or para to the hydroxy group on each aromatic nucleus.

Non-limiting examples of suitable specific diaminodihydroxy compounds which may be used in the present invention are 3,3'-diamino, 4,4'-dihydroxy-biphenyl; 3,3'-dihydroxy, 4,4'-diamino-biphenyl; 3,3'-dihydroxy 4,4'-diamino diphenyloxide; 3,3'-dihydroxy, 4,4'-diamino diphenylsulfone; 2,2'-bis(3-amino-4-hydroxy-phenyl) propane; bis(3-hydroxy-4-aminophenyl) methane; 3,3'-dihydroxy-4,4'-diamino benzophenone; 1,1-bis(3-hydroxy-4-aminophenyl) ethane; 1,3-bis(3-hydroxy-4-aminophenyl) propane; and 2,2'-bis(3-hydroxy-4-aminophenyl) propane.

The preferred diaminodihydroxy compounds are 3,3'-diamino, 4,4'-dihydroxy-biphenyl; and 3,3'-dihydroxy, 4,4'-diamino-biphenyl.

The manner in which the diaminohydroxy aromatic compound is prepared is not a part of the present invention and is well known.

Diesters and anhydrides of the aromatic dicarboxylic acids, including the diesters and anhydrides of heterocyclic dicarboxylic acids wherein the carboxyl groups are substituents upon carbon in a ring compound selected from the class consisting of pyridine, pyrazine, furan, quinoline, thiophene and pyran are used in conjunction with the above described aromatic tetraamines and diaminodihydroxy aromatic compounds.

Non-limiting examples of anhydrides and aliphatic and aromatic diesters of aromatic dicarboxylic acids include the anhydrides, alkyl esters having from one to 12 carbon atoms in the alkyl group and diphenyl esters corresponding to isophthalic acid, terephthalic acid, naphthalene 1,4-dicarboxylic acid, naphthalene 1,6-dicarboxylic acid, naphthalene 2,6-dicarboxylic acid, bibenzoic acid, 4,4'-biphenyl dicarboxylic acid, diphenyl ether 4,4'-dicarboxylic acid, and diphenyl methane 4,4'-dicarboxylic acid.

Non-limiting examples of suitable diphenyl esters of heterocyclic dicarboxylic acids include the diphenyl esters corresponding to pyridine 2,5-dicarboxylic acid, pyridine 2,6-dicarboxylic acid, pyridine 3,5-dicarboxylic acid, pyrazine 2,5-dicarboxylic acid, furan 2,5-dicarboxylic acid and quinoline 2,6-dicarboxylic acid.

Further, aliphatic dicarboxylic acids may be used in conjunction with the aromatic tetraamines and diaminodihydroxy aromatic compounds heretofore described to prepare the desired random benzimidazole-benzoxazole copolymers. The use of these aliphatic dicarboxylic acids, however, may lessen the thermal stability of the copolymer.

The aliphatic dicarboxylic acids may be represented by the general formula:

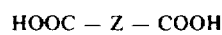

wherein Z is a divalent aliphatic or cycloaliphatic hydrocarbon radical, and preferably an aliphatic hydrocarbon radical consisting of methylene groups.

Particularly useful dicarboxylic acids are those wherein the number of methylene groups varies from four to eight.

Non-limiting examples of suitable specific aliphatic dicarboxylic acids which may be used in the present invention are sebacic and adipic acids.

Aromatic diamino carboxylate compounds which may be used in the present invention in lieu of all or a portion, e.g., 5 to 95 percent, and preferably 10 to 50 percent, of the aromatic tetraamino compound, with proportionately less, equimolar-wise, of the dicarboxylic acid or derivative, have ortho disposed diamino substituents and a carboxylate group substituent on the aromatic nucleus and may be represented by the general formula:

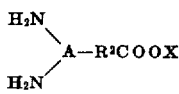

wherein A is aromatic and has the meaning given above for R; $R^2$ is a covalent bond or a divalent hydrocarbon radical of from one to 12 carbon atoms, X is a hydrogen, alkyl, e.g., methyl, or aryl, e.g., phenyl, radical; the carboxyl and diamino substituents are attached directly to a carbon atom of the aromatic nucleus; and the two amino radicals are in ortho relationship to one another.

The aromatic nucleus A may be any mono or poly aromatic nucleus disclosed in the above tetraamine description.

Preferably, the carboxyl group is para to one of the amino groups.

Non-limiting examples of suitable specific diaminophenyl-carboxylate compounds which may be used in the present invention are phenyl-3,4-diaminobenzoate, phenyl-6,7-diamino-beta-naphthoate, as well as the phenyl esters of 3′,4′-diamino-3-biphenyl-carboxylic acid, m-(3,4-diaminophenoxy)-benzoic acid, 3,4-diamino-hydrocinnamic acid, and other similar compounds.

The manner in which the diamino aromatic carboxylate compounds are prepared is well known and does not form a part of the present invention.

Aromatic hydroxy amino carboxylate compounds which may be used in the present invention in lieu of all or a portion, e.g., 5 to 95 percent, and preferably 10 to 50 percent, of the aromatic diaminodihydroxy compound, with proportionately less, equimolar-wise, of the dicarboxylic acid or derivative, have ortho disposed amino hydroxy substituents on the aromatic nucleus and may be represented by the general formula:

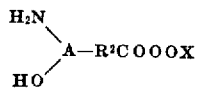

wherein A has the meaning given above for A, and wherein $R^2$ has the meaning given above for $R^2$, X has the meaning given above for A, and wherein the amino and hydroxy substituents are attached directly to a carbon atom of the aromatic nucleus and are in ortho relationship to one another.

Preferably, the carboxyl group is directly attached to a carbon atom of the aromatic nucleus and is in para position to either the hydroxy group or the amino group.

Non-limiting examples of suitable specific amino hydroxy aromatic carboxylate compounds which may be used in the present invention are 3-amino-4-hydroxy benzoic acid, 4-amino-3-hydroxy-benzoic acid, 3-amino-4-hydroxy hydrocinnamic acid, p-(3-amino-4-hydroxy-phenyl) benzoic acid, p-(4-amino-3-hydroxyphenyl) benzoic acid, and their phenyl esters.

Preferred amino hydroxy aromatic carboxylate compounds are 3-amino-4-hydroxy benzoic acid and 4-amino-3-hydroxy benzoic acid.

The manner in which the amino hydroxy aromatic carboxylate compounds are prepared is well known and does not form a part of the present invention.

Typically, the benzimidazole-benzoxazole copolymers of the present invention may be formed by reacting one or more of the above described aromatic tetraamines, one or more of the above described diaminodihydroxy aromatic compounds and equimolar proportions of one or more of the above described anhydrides or esters of aromatic dicarboxylic acids in reactant mole ratios of about 9:1:10 to 1:9:10, preferably about 9:1:10 to 1:1:2, and most preferably about 9:1:10 to 3:2:5, for example by reacting 3,3′-diamino benzidine, 3,3′-diamino, 4,4′-dihydroxy-biphenyl, and diphenyl isophthalate, in a reactant mole ratio of 3:2:5 as exemplified by the following reaction:

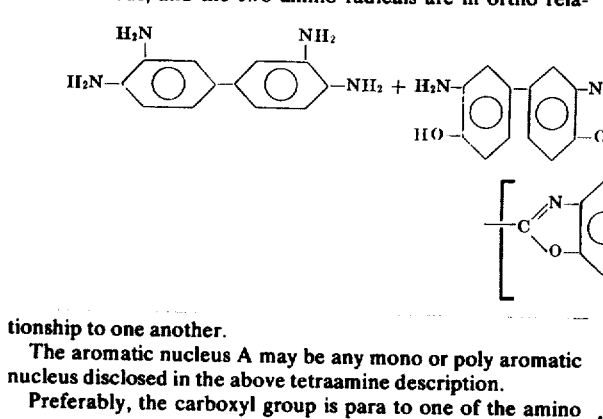
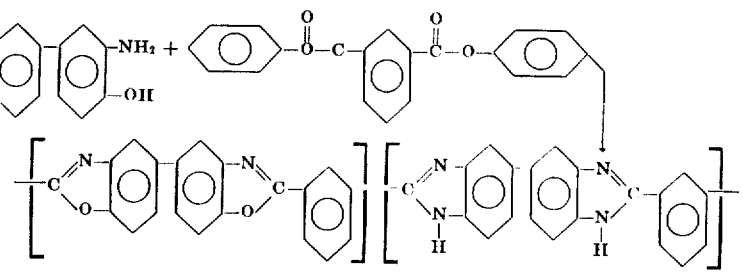

Polymerization may be accomplished in a number of ways.

Preferably, polymerization is accomplished in a one- or two-stage process comprising a melt polymerization followed by a solid state polymerization.

In the two-stage process, the reactants are introduced into a first stage melt polymerization reaction zone and heated therein at a temperature above about 150° C., preferably between about 200° C. to 350° C., and more preferably from about 250° to 300° C. The reaction is conducted in a substantially oxygen free atmosphere, e.g., between about .1–100 ppm oxygen, until a foamed prepolymer is formed. Usually, the first stage reaction is continued unto a prepolymer is formed having an inherent viscosity, expressed as deciliters per gram, of at least about 0.1, and preferably from about 0.2 to 0.5.

The inherent viscosity, (I.V.), as used in the present specification and claims is determined from a solution of 0.4 grams of the polymer in 100 mls of 97% $H_2SO_4$ at 25°C.

After the conclusion of the first stage reaction, which normally takes between about 0.25 to 5 hours or more, the prepolymer is cooled and then powdered or pulverized in any convenient manner. The resulting prepolymer powder is then introduced into a second stage polymerization zone wherein it is heated under substantially oxygen free conditions, as described above, to yield a benzimidazole-benzoxazole random copolymer product, desirably having an I.V., as measured above, of at least 0.3, and preferably at least 0.5, e.g., 0.5 to 1.0 or more.

The temperature employed in the second stage is at least 250° C., preferably at least 300° C., and more preferably from about 325° to 425° C. The second stage reaction generally takes between about 0.5 to 5 hours or more.

Atmospheric, superatmospheric, or subatmospheric pressures may be used in the above described stages in any convenient manner so as to remove volatile byproducts such as phenol and water from the reaction zones as they are formed or evolved.

Further, polymerization may be accomplished by a one-stage, melt polymerization followed by a solid state polymerization process.

In the one-stage process, the reactants may be reacted under autogenous pressure in a closed reaction zone in one step by uninterrupted heating temperatures of about 200° to 450° C. and preferably about 250° to 350° C., followed by a depressurization to pressures less than about 25 psi, e.g., between substantially atmospheric pressure at 25 psi, and a post heating period at temperatures of about 300° C., and preferably, about 360° to 500° C., for at least 2 hours, and more preferably 3 to 4 hours. After cooling, the polymer may be discharged from the reaction zone as a free flowing powder.

In the above described polymerization methods, non-reactive species such as phenol and diphenyl ether may be added to the reaction mixture for purposes such as improving the heat transfer of the system and improving homogenity of the melt.

Further, polymerization may be accomplished in a one-stage procedure using an inert inorganic solvent for the reactants such as polyphosphoric acid.

This procedure can be carried out by dissolving and heating the reactants in polyphosphoric acid at temperatures of about 100° to 250° C., and more preferably at about 150° to 200° C. After about 1 to 24 hours, depending on the particular reactants used, temperatures employed, etc., the copolymer can be isolated by pouring the solution into water and washing the acid from the copolymer.

This reaction is usually conducted in the presence of an inert atmosphere of nitrogen, argon or the like.

The polyphosphoric acid preferably employed has a $P_2O_5$ equivalent of about 70 to 85 percent which is a solution of ortho and pyro phosphoric acids mixed with various polyphosphoric acids, e.g., their trimers, tetramers, pentamers, and hexamers.

Moreover, the polymerization may also be effected in a two-stage process which comprises polymerization in an inert organic solvent followed by solid state polymerization.

In the first stage, an organic solvent for at least one of the reactants is used, the solvent being inert to the reactants. Suitable organic solvents include dimethylacetamide, dimethylformamide, N-methyl pyrrolidone and tetramethylene sulfone.

The reaction is preferably carried out under anhydrous conditions at temperatures of about −40° to 100° C., and more preferably about −20° to 25° C. for at least about 0.25 hours, and preferably about 0.25 to 2 hours. The solvent is then removed in any convenient manner, such as by washing with a lower alcohol.

The prepolymer is then heated in a solid state polymerization zone at temperatures of about 200° to 450° C., and more preferably about 300° to 400° C., for at least about 0.5 hours, and more preferably, about 1 to 3 hours.

The reactions in both stages are conducted in the presence of an inert atmosphere such as nitrogen, and atmospheric, subatmospheric or superatmospheric pressure may be used.

The above described reactions may be carried out in any conventional type stirred reaction or polymerization zone on a continuous, semi-continuous or batch basis.

The random benzimidazole-benzoxazole copolymers formed by the process of the present invention are characterized by a yellowish tan to red color, and normally exist in physical form as a powder.

Thermal gravimetric analysis of representative copolymers show about a 5 percent weight loss in air about 550° C.

The molecular weight of the random copolymers produced herein is indicated by an inherent viscosity of about 0.3 to 1.5, and more usually about 0.4 to 1.0.

The benzimidazole-benzoxazole random copolymers prepared in accordance with this invention may be shaped to form fibers, films and other shaped articles of wide utility. The polymers of the present invention may be dissolved in suitable solvents, e.g., dimethylacetamide or sulfuric acid, to form a spinning or casting solution which may be fabricated into filaments and films. After suitable post treatment such as drawing and heating, the filaments may be knitted or woven into fabrics having excellent high temperature properties and are useful in applications such as space suits, and the like.

It will also be apparent that other modifying agents such as fillers, e.g., carbon black, silica, glass fibers, etc., as well as heat and light stabilizers, dyes and pigments, may be incorporated in the polymers without departing from the scope of the invention.

The invention is additionally illustrated by the following examples. All parts and percentages are by weight in the examples, as well as in other parts of the specification and claims, unless otherwise indicated.

EXAMPLE I

A random benzimidazole-benzoxazole copolymer consisting of 50 percent recurring benzimidazole structural units and 50 percent recurring benzoxazole structural units is prepared by reacting 3,3-diamino benzidine, 3,3'-diamino-diamompO-4,40dihydroxy biphenyl, and diphenyl isophthalate in a reactant mole ratio of 1:1:2, respectively, by a two-stage, atmospheric pressure, melt condensation solid state polymerization procedure. The reactants are melted together at about 180° to 200° C. in an inert atmosphere, heated to 300° C., allowed to foam, and then crushed and reheated to 350° C. for 4 hours. This copolymer has an inherent viscosity of 0.5 The copolymer shows a 5 percent weight loss in air at 540° C. by thermal gravimetric analysis, and has a solubility of about 15 percent in concentrated sulfuric acid.

EXAMPLE II

Using the condensation procedure described in Example I, a random copolymer consisting of 50 percent recurring benzimidazole structural units and 50 percent recurring benzoxazole structural units is prepared from 2,2'-di(3-amino-4-hydroxy phenyl) propane, 3,3'-diaminobenzidine, and diphenyl isophthalate in a reactant mole ratio of 1:1:2 respectively. The copolymer has an inherent viscosity of 0.3, with excellent solubility at room temperature in concentrated sulfuric acid. The thermal gravimetric analysis showed at 5 percent weight loss in air at 575° C. for 1 hour.

EXAMPLE III

Using the condensation procedure described in Example I, a random copolymer consisting essentially of 90 percent recurring benzimidazole units and 10 percent recurring benzoxazole units was made using 3-amino-4-hydroxy benzoic acid, 3,3'-diaminobenzidine, and diphenyl isophthalate in a reactant mole ratio of 1:9:10, respectively. The inherent viscosity of this random copolymer was 0.74. This copolymer is soluble in dimethylacetamide from which fibers and films may be produced.

EXAMPLES IV-VII

Four random copolymers, containing different amounts of recurring benzimidazole and benzoxazole groups, were made using 3,3'-diaminobenzidine, 3,3'-diamino-4,4'-dihydroxy biphenyl, and diphenyl isophthalate in accordance with the procedure described in Example I. These random copolymers had the following compositions, I.V. (inherent viscosity), and solubilities (in dimethylacetamide at 225° C.):

| Example | Composition, % PBI/PBO | I.V., dl/g | Solubility, % |
|---------|------------------------|------------|---------------|
| IV      | 90/10                  | 0.74       | 97.5          |

| | | | |
|---|---|---|---|
| V | 80/20 | 0.76 | 96.3 |
| VI | 70/30 | 0.46 | 97.3 |
| VII | 60/40 | 0.70 | gel |

Thus, the above examples show that a certain minimum percentage, i.e., about 60 percent, of recurring benzimidazole structural units is required to yield a dimethylacetamide soluble product so as to be most useful in various solution spinning or solution casting processes, and that this miminum percentage does not appear to be particularly sensitive to I.V., i.e., molecular weight.

The 80/20 copolymer of Example V has the following elemental analysis which shows agreement with theoretical calculations:

| | Actual | Theoretical |
|---|---|---|
| %C | 76.8 | 77.8 |
| %H | 3.87 | 3.79 |
| %N | 15.98 | 16.34 |
| %O | 2.17 | 2.06 |

Further, the infrared spectra of these copolymers show both benzimidazole and benzoxazole structures present.

EXAMPLES VIII–IX

Two random copolymers, containing different amounts of recurring benzimidazole and benzoxazole groups, were made using 3,3'-diaminobenzidine 3,3'-dihydroxy-4,4'-diamino biphenyl, and diphenyl isophthalate in accordance with the procedure described in Example I. These random copolymers had the following compositions and I.V.:

| Example | Composition, % PBI/PBO | I.V.,dl/g |
|---|---|---|
| VII | 90/10 | 0.65 |
| IX | 80/20 | 0.86 |

The polymers of the present invention may be dissolved in a suitable solvent, e.g., dimethylacetamide, dimethylformamide, or dimethylsulfoxide, to form a spinning or casting solution which may be fabricated into filaments or films. After suitable post treatments such as drawing and heating, the filaments may be knitted or woven into fabrics having excellent high temperature properties and are useful in applications such as space suits, parachutes, and the like.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

We claim:

1. A random film and fiber forming copolymer which consists essentially of about 90 to about 10 percent of recurring benzimidazole structural units selected from the group consisting of

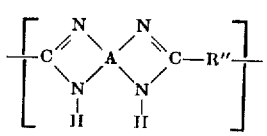

and

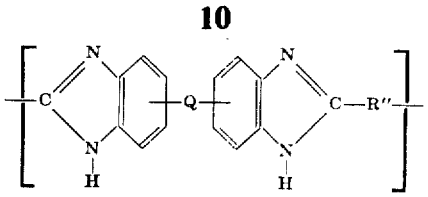

and

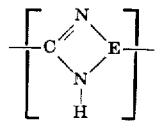

and corresponding from about 10 to 90 percent of recurring benzoxazole structural units selected from the group consisting of

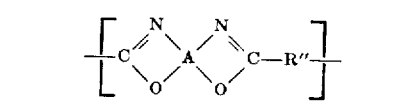

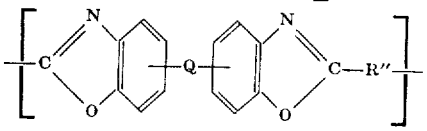

and

wherein A is selected from the group consisting of

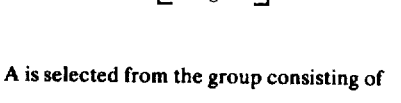

wherein Q is selected from the group consisting of;

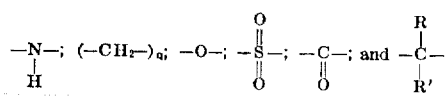

wherein R and R' are monovalent hydrocarbon radicals, $q$ is a whole number equal to from 1 to 6 inclusive, and the bonds of Q are para to either of the oxygen or nitrogen atoms.
wherein R'' is a divalent radical selected from the groups consisting of arylene and alkylene radicals; and
wherein E is selected from the groups consisting of

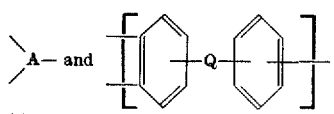

wherein A and Q are defined above.

2. The random film and fiber forming copolymer of claim 13 wherein the recurring benzimidazole structural units comprise at least about 60 percent of the copolymer.

3. The random film and fiber forming copolymer of claim 13 where Q is a single bond; R'' is phenylene; and E is

4. A random film and fiber forming copolymer which consists essentially of from 90 to 50 percent of recurring benzimidazole structural units exemplified by the formula

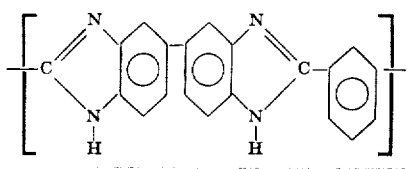

and correspondingly from 10 to 50 percent of recurring benzoxazole structural units exemplified by the formula

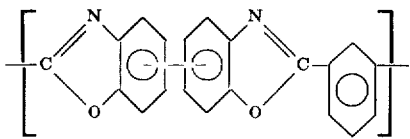

5. A process for making random fiber and film forming benzimidazole - benzoxazole copolymers which comprises reacting by contacting in a polymerization zone at from about 150° to about 450° C. at least one aromatic tetraamine compound selected from the group consisting of

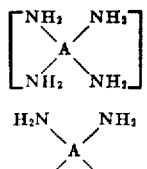

and

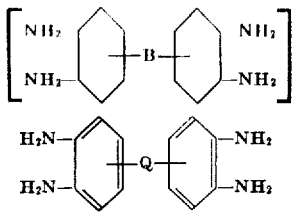

at least one diamino-dihydroxy aromatic compound selected from the group consisting of

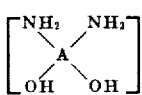

and

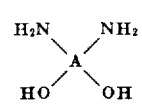

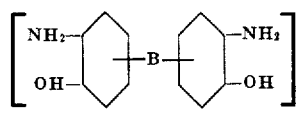

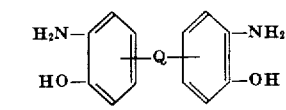

and a compound selected from the group consisting of dianhydrides of aromatic dicarboxylic acids, and dianhydrides of aliphatic dicarboxylic acids having from four to eight methylene groups, the diphenyl ester of an aromatic dicarboxylic acid, and the diphenyl ester of a heterocyclic dicarboxylic acid wherein the carboxyl groups are substituents upon carbon in a ring compound from the class consisting of pyridine, pyrazine, furan, and quinoline;
wherein A is selected from the group consisting of

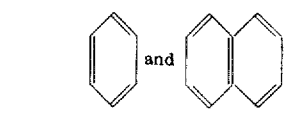

wherein Q is selected from the group consisting of;

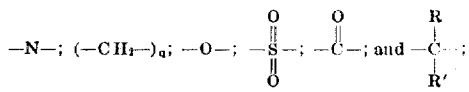

wherein R and R' are monovalent hydrocarbon radicals, $q$ is a whole number equal to from 1 to 6 inclusive and the bonds of Q are para to either of the oxygen or nitrogen atoms.

6. The process of claim 5 which further comprises adding to the polymerization zone at least one compound selected from the group consisting of a. aromatic diamino carboxylate compounds having ortho disposed diamino substituents and a carboxylate group substituent on the aromatic nucleus as represented by the structural formula

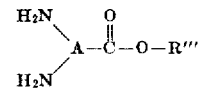

and

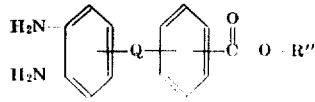

b. aromatic hydroxy amino carboxylate compounds which have ortho disposed amino and hydroxy substituents on the aromatic nucleus as represented by the structural formula

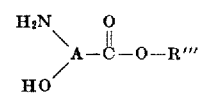

and

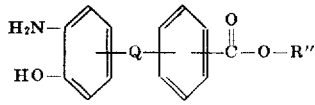

wherein A is selected from the group consisting of

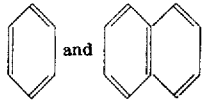

and wherein Q is selected from the group consisting of;

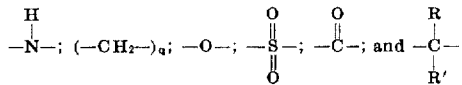

wherein R and R' are monovalent hydrocarbon radicals, $q$ is a whole number equal to from 1 to 6 inclusive, and the bonds of Q are para to either of the oxygen or nitrogen atoms, and
wherein R''' is selected from the group consisting of hydrogen, alkyl, and aryl radicals.

7. The process of claim 6 wherein the diamino phenyl carboxylate compound is phenyl-3,4-diamino benzoate and the aromatic hydroxy amino carboxylate compound is 3-amino-4-hydroxy benzoic acid.

8. The process of claim 5 wherein the aromatic tetrammine is 3,3'-diamino benzidine, the diamino dihydroxy aromatic compound is selected from the group consisting of 3,3'-diamino-4,4'-dihydroxy biphenyl and 3,3'-dihydroxy-4,4'-diamino biphenyl, and the diester of aromatic dicarboxylic acid is diphenyl isophthalate.

9. A process for making random fiber and film forming benzimidazole-benzoxazole copolymers which comprises
   1. reacting by contacting at about 200° to 350° C. In a melt polymerization zone under substantially oxygen free conditions
      a. an aromatic tetra-amine compound selected from the class consisting of

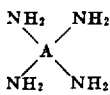

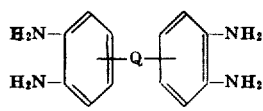

and
      b. a diaminodihydroxy aromatic compound selected from the group consisting of

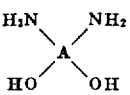

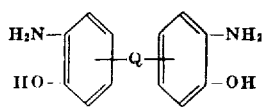

wherein A is selected from the group consisting of

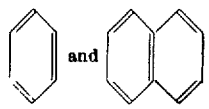

and wherein Q is selected from the group consisting of;

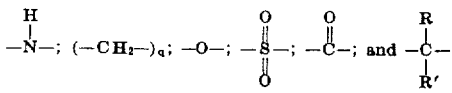

wherein R and R' are monovalent hydrocarbon radicals, q is a whole number equal to from 1 to 6 inclusive, and the bonds of Q are para to either of the oxygen or nitrogen atoms; and
      c. a compound selected from the group consisting of the anhydrides of aromatic dicarboxylic acids, the diphenyl ester of an aromatic dicarboxylic acid, and the diphenyl ester of a heterocyclic dicarboxylic acid wherein the carboxyl groups are substituents upon carbon in a ring compound from the class consisting of pyridine, pyrazine, furan, and quinoline; and,
   2. further polymerizing the product of the melt polymerization by heating the product at a temperature between about 300° to 400° C. under substantially oxygen free conditions to produce a random copolymer having an intrinsic viscosity of about 0.4 to 1.0 as determined from a solution of 0.4 grams of the polymer in 100 mls of 97% $H_2SO_4$ at 25° C.

10. The process of claim 9 which further comprises adding to the melt polymerization zone at least one member selected from the group consisting of a. aromatic diamino carboxylate compounds having ortho disposed diamino substituents and a carboxylate group substituent on the aromatic nucleus as represented by the structural formula

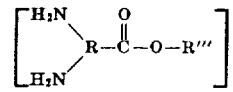

wherein R is aromatic and has the meaning give for R

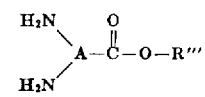

and

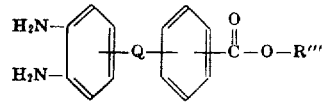

b. aromatic hydroxy amino carboxylate compounds having ortho disposed amino and hydroxy substituents on the aromatic nucleus and represented by the structural formula

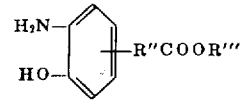

wherein R" is selected from the group consisting of a covalent bond and a divalent hydrocarbon radical, and R''' is selected from the the group consisting of hydrogen, alkyl and aryl radicals.

11. The process of claim 9 wherein the aromatic tetraamine compound, the diaminodihydroxy aromatic compound, and the diester or anhydride of an aromatic dicarboxylic acid is reacted in a reactant mole ratio of about 9:1:10 to 1:9:10.

12. A random fiber and film forming copolymer which consists essentially of about 90 to 50 percent of recurring benzimidazole structural units selected from the class consisting of

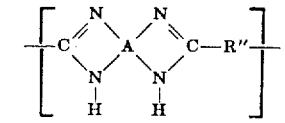

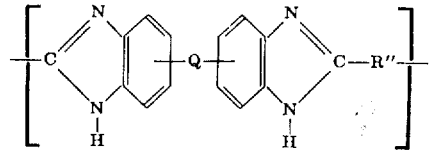

and

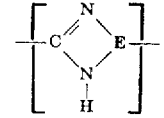

and correspondingly from about 10 to about 50 percent of recurring benzoxazole structural units selected from the group consisting of

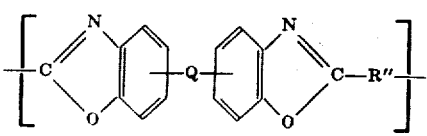

and

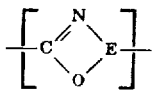

wherein A is selected from the group consisting of

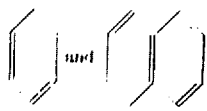

where Q is selected from the group consisting of;

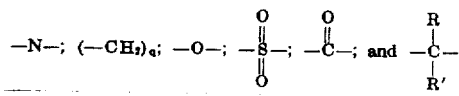

wherein R and R' are monovalent hydrocarbon radicals, $q$ is a whole number equal to from 1 to 6 inclusive, and the bonds of Q are para to either of the oxygen or nitrogen atoms, wherein R" is a divalent radical selected from the group consisting of arylene radicals an alkylene radicals having from four to eight methylene groups; and wherein E is selected from the group consisting of

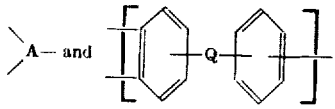

wherein A and Q are defined above.

* * * * *